W. EDGE.
CAR BRAKE.
No. 22,280. Patented Dec. 14, 1858.
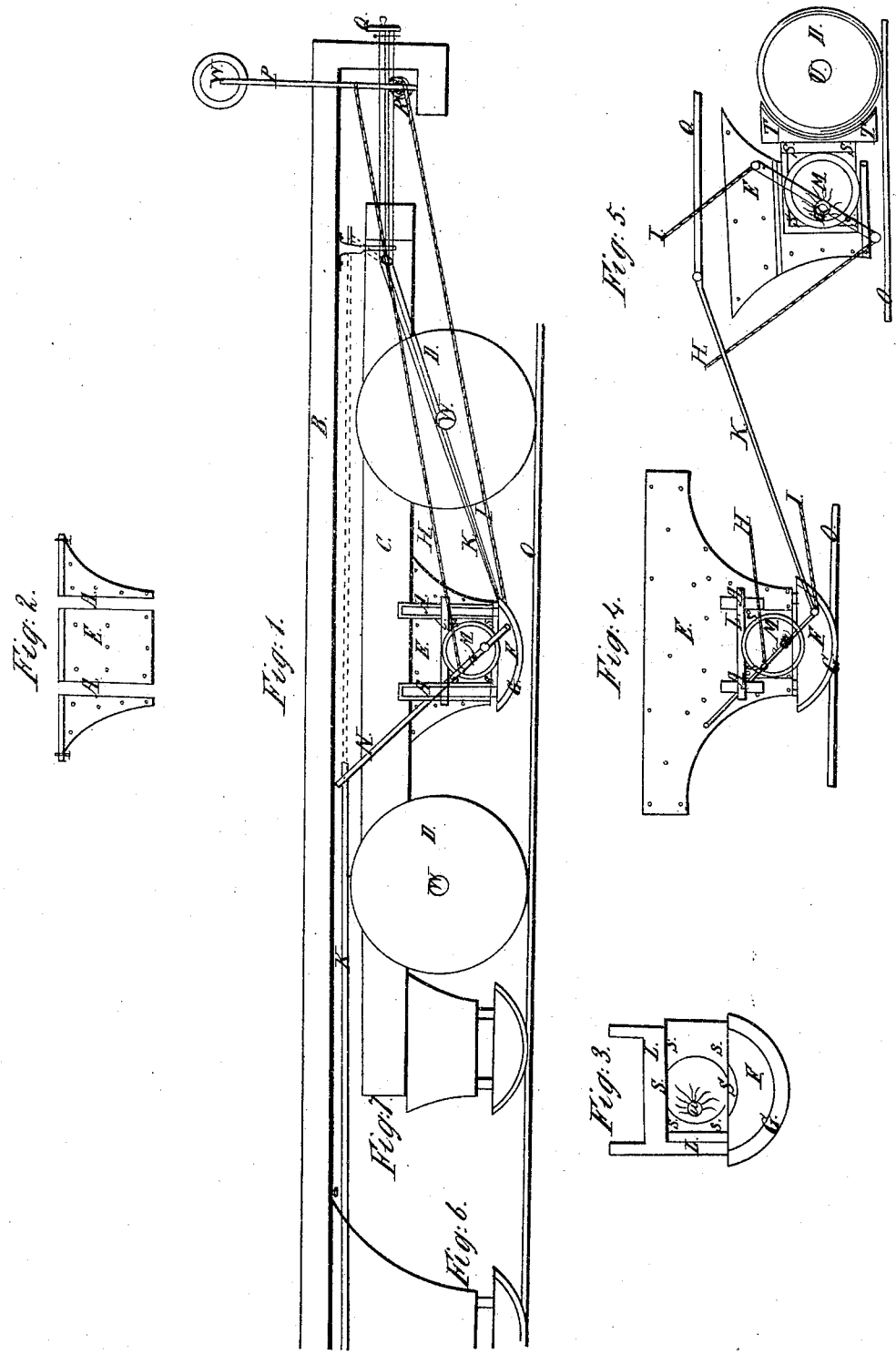

UNITED STATES PATENT OFFICE.

WILLIAM EDGE, OF DONNINGTOWN, PENNSYLVANIA.

RAILROAD-BRAKE.

Specification of Letters Patent No. 22,280, dated December 14, 1858.

*To all whom it may concern:*

Be it known that I, WILLIAM EDGE, of Donningtown, in the county of Chester and State of Pennsylvania, have invented a new and Improved Self-Acting Safety Car-Brake; and I do hereby declare that the following is a full and exact description thereof, reference being had to the accompanying drawings and to the letters of reference marked thereon, in which—

Figure 1, is a perspective view, showing its application to the truck frame between the car wheels; Fig. 2 the pedestal; Fig. 3 the flanged safety block frame eccentric cam and slides; Fig. 4 the face plate or covering, which when bolted on forms a firm and permanent stay to the whole; Fig. 5 exhibits the application of a brake block to car wheel by means of this invention; Figs. 6, and 7, merely represent its application to other parts of the car.

The parts marked A, are grooves in pedestal, in which the frame L of the safety flanged block plays; B, is bottom of car body; C, the truck frame; D, the car wheels; E, the pedestal; F, the flanged safety block; G, the flange; H the chain to move the blocks by hand on the rail or wheel; I the chain to move the blocks off; K, connecting rod gearing the brake to draft iron on car bumper, causing it to operate when the bumpers press together and is removed so soon as the draft irons are stretched making it a complete self operating brake, at the engineer's will; M, eccentric wheel; N, lever; O, railroad track; P, shaft to operate the brake by hand; Q, bumper; R, the chain wound around shaft, when the other is unwound; S, the cam block; T, brake block pressed to car wheel by cam at the same time it is operating the flanged safety block on rail; U the center or axle of wheels.

This safety pedestal flanged block eccentric power &c. as herein described can be attached to any size, construction, or class of cars or engines varying in model or material as the case may be, operating either by bumper, or by the wheel and chain gearing. In either case the flanged safety block presses on the track rail, or the ordinary block to the car wheel, or both at the same time as the eccentric and cam are moved, thus bringing the weight of the car directly in contact with the rail causing the car or train to stop, making a very powerful and certain brake.

When geared to the draft iron, the moment the engineer shuts off steam or the bumpers press, every brake on the train is applied and the moment the valve is again drawn to start the train, the brakes are lifted by the draft irons, thus making it self operating as a brake, under the entire control of the engineer, and removing the great liability of car wheels breaking, as is caused so frequently by the application of a severe brake to the wheel. Besides in the event of a car wheel or axle breaking the flanged block catches on the track rail, sliding and acting as a brake, keeping the car erect and on the track, not only tending to slacken the speed but is a safety in any event, from its principle and construction, being a novel machine, performing double duty, and will greatly diminish the liability to accident when brought into use.

What I claim as my invention, and desire to secure by Letters Patent, is—

The application to railroad cars of a vertical self acting safety car brake, consisting of a flanged safety block F, cam wheel M, axle U, lever N, chains H, and I, connecting rods K, bumper Q, wheel block S, pedestal E, and shafts P, the whole combined and operated substantially as described in said specification.

WM. EDGE.

Witnesses:
WM. ROGERS,
JOHN P. EDGE.